United States Patent [19]

Konzak et al.

[11] Patent Number: 5,372,627
[45] Date of Patent: Dec. 13, 1994

[54] PROCESSES FOR PRODUCING ETHYLENE GLYCOL PHOSPHATE ESTERS AND FOLIAR FERTILIZERS CONTAINING SAME

[75] Inventors: Calvin F. Konzak, Pullman; Enrique A. Polle, Pullman, both of Wash.

[73] Assignee: Washington State University Research Foundation, Pullman, Wash.

[21] Appl. No.: 976,368

[22] Filed: Nov. 13, 1992

Related U.S. Application Data

[63] Continuation-in-part of Ser. No. 858,550, Mar. 27, 1992, abandoned, which is a continuation of Ser. No. 758,759, Sep. 12, 1991, abandoned, which is a continuation of Ser. No. 270,762, Nov. 14, 1988, abandoned.

[51] Int. Cl.$^5$ ................................................ C05C 9/00
[52] U.S. Cl. ................................................ 71/33; 71/27; 71/63
[58] Field of Search ......................... 71/33, 27, 63; C05C 9/00

[56] References Cited

FOREIGN PATENT DOCUMENTS 0566809  8/1977  U.S.S.R. ................................ 71/27

OTHER PUBLICATIONS

Chang, *Chemistry* (1981) pp. 488–491, Random House, N.Y., Williams College.

*Primary Examiner*—Mark L. Bell
*Assistant Examiner*—Paul Marcantoni
*Attorney, Agent, or Firm*—Vincent L. Carney

[57] ABSTRACT

Processes for the production of ethylene glycol phosphate esters using ethylene glycol and phosphoric acid. These reactants mixed and heated with an esterification promoter which can be an oxide or hydroxide, such as an alkali, alkaline earth or other metal oxide or hydroxide. The mixture can be reacted at atmospheric pressures and temperatures in excess of 150° C., thus speeding the esterification. Boiling is preferred during the reaction to improve water removal. Excess ethylene glycol can advantageously be used to aid in efficient conversion. Excess unreacted ethylene glycol is also significant when the reaction products are used as foliar fertilizers. The cations of some promoters substitute into the esters and can be used to provide secondary or trace elements of nutritional value when the reaction products are used as foliar fertilizers.

28 Claims, No Drawings

PROCESSES FOR PRODUCING ETHYLENE GLYCOL PHOSPHATE ESTERS AND FOLIAR FERTILIZERS CONTAINING SAME

RELATED CASES

This application is a continuation-in-part of application Ser. No. 07/858,550 filed Mar. 27, 1992, abandoned, which is a continuation of application Ser. No. 07/758,759 filed Sep. 12, 1991, abandoned, which is a continuation of application Ser. No. 07/270,762 filed Nov. 14, 1988, abandoned, by Konzak et al for PROCESSES FOR PRODUCING ETHYLENE GLYCOL PHOSPHATE ESTERS AND FOLIAR FERTILIZERS CONTAINING SAME.

TECHNICAL FIELD

This invention relates generally to processes for making phosphate esters of ethylene glycol, and in greater particularity, phosphate esters of ethylene glycol which are capable of being used as nutrients in foliar fertilizers.

BACKGROUND OF THE INVENTION

Presently known processes for synthesizing phosphate esters of ethylene glycol take an unusually long period of time and consume substantial amounts of energy. They also require relatively expensive reactants. For example, P. Carre ("Sur les ethers phosphoriques du glycol", *Compt. Rend.* 138:374–75 (1904) reported an esterification process which reacts ethylene glycol and phosphoric acid under low pressure. The Carre procedure involved heating an equimolecular mixture of such reactants using a vertical condenser at 140°–145° C. under vacuum pressures of 15 to 18 mm of Hg. The Carre process required approximately 10 hours to complete the reaction. A mixture of 3.5% of the triester, 43% to 57% of the diester, and 44% of the monoester obtained.

Bailly and Gaume ("Sur l'action de quelques halohydrines sur le phosphate neutre de sodium en solution aqueuse et sur quelques glycophosphates", *Compt. Rend.* 178:1191–93 (1924)) reported the preparation of sodium ethylene glycol phosphate by reacting an equimolecular mixture of ethylene glycol monochlorohydrin with neutral sodium phosphate in an 0.5N aqueous solution at room temperature. This procedure required 264 hours of reaction time to attain 81.5% conversion of the ethylene glycol monochlorohydrin to $Na_2PO_4C_2H_4OH$.

Ethylene glycol phosphate in the barium form was prepared by Plimmer and Burch (Esters of phosphoric acid, Part I, *Chem Soc.*, London 1929:279– 291). Their method involved first preparing chloroethyl phosphoric ester from phosphoryl chloride and ethylene chlorhydrin, and then converting the resulting choroethyl phosphoric ester into a barium phosphate ester of ethylene glycol ($OH-C_2H_4O-PO_3Ba$). By a similar described procedure, a mixture of monoesters and diesters was prepared. The described methods are cumbersome and lengthy.

Atherton et al. (*J Chem. Soc.* 1945:382) prepared sodium ethylene glycol phosphate by reacting ethylene oxide and disodium hydrogen phosphate. At first glance, the method appears to be simple; however, it has drawbacks. For example, ethylene oxide is a carcinogenic substance requiring precautions for its handling. Also, less than desirable conversion of the ethylene oxide would be expected. Further, the requirement for the prior synthesis of disodium hydrogen phosphate would limit the use of this method in industrial processes.

The simplest of the prior art procedure appears to be the esterification of orthophosphoric acid with ethylene glycol (so called "direct esterification"). The one taught by Carre and described above is one version of this procedure. However, the prolonged heating requirement is a major drawback and prevents any practical commercialization of the process. Attempts by the applicants to speed the reaction by raising the temperature have proven to be ineffective since higher temperature causes carbonization of the reaction mixture with very poor yield and degradation of the ethylene glycol phosphate esters being sought.

Another version of the "direct esterification" procedure for making phosphate esters for use as a fertilizer, but as a fertilizer applied to the soil, is disclosed in Soviet Union patent 566,809 to Borisov which discloses phosphate esters for application to the soil and a method of making them. The method by Borisov consists of heating an equimolecular mixture of phosphoric acid and ethylene glycol for 3 to 4 hours, cooling and neutralizing it with 50% KOH and then drying at 90°–100 degrees C.

Neither the patent to Borisov nor the publication of P. Carre disclose use of a phosphate ester as a foliar fertilizer and the methods they disclose for the synthesis of their phosphate ester are time-consuming and have low yields. The yields from the Borisov procedure are 60% or less of esterification. Most of the esterification is produced in the first 3–4 hours of heating. If additional esterification is desired at 90 degrees C. during drying, many hours of heating at 90 degrees is necessary making the procedure uneconomical.

Foliar application of phosphorus fertilizers is known and has been used for many years in spite of certain difficulties under some circumstances, such as for example: (1) leaf damage (burning) is caused by the phosphorus fertilizer solutions (osthosphosphates leads to burning problems and thus needs to be avoided); (2) there is poor absorption of phosphorus bearing compounds through the waxy cuticle of the leaf; (3) some phosphorus fertilizers have low mobility of within the plant and are unable to translocate from the leaf to other parts of the plant through the narrow phloem vessels; (4) there is a tendency to cause nutritional imbalances within the plant; and (5) when used at low application rates such as 10 or less gallons per acre in solutions diluted to avoid leaf damage, such as for cereals, little nutritive value is associated with the fertilizer.

SUMMARY OF THE INVENTION

Accordingly, it is an object of the invention to provide an improved foliar fertilizer.

It is a another object of the invention to provide an improved method of making a foliar fertilizer.

It is a still further object of the invention to provide a method of making and using phosphate fertilizer that can be efficiently foliarly applied to plants at a volumetric rate of 10 or less gallons per acre, supply adequate phosphorus to the plants and not result in leaf burning.

In accordance with the above and further objects of the invention, a liquid aqueous foliar fertilizer is produced by mixing at least one alcohol, at least one esterification reaction promoter and at least one phosphoric acid and heating the mixture from the previous step to temperatures in excess of 150° C. to remove water therefrom and cause esterification. The pH of the reaction product is adjusted to a pH level and the water content is adjusted to concentration suitable for application to foliage of plants being fertilized. Preferably, the alcohol is a water miscible polyhydroxy alcohol. In a suitable application the fertilizer is applied in large droplets and a rate of 10 or less gallons per acre at a concentration suitable to provide sufficient phosphorus to the plants and with sufficient hygroscopic material to maintain the fertilizer in liquid form from 1 to ten days.

Advantageously, the esterification reaction promoter is an oxide or hydroxide and includes an element of nutritional value to at least one type of plant being fertilized. More specifically, the reaction mixture is diluted water sufficient to provide a molar concentration of said phosphate esters of at least one half molar and the one or more liquid, water miscible, phosphate alcohol ester or esters have a concentration or collective concentration therein greater than 0.5 molar, and at least one liquid hygroscopic agent has a concentration therein sufficient to help maintain applied droplets of foliar fertilizer in liquid form on the foliage for at least one day. The fertilizer may include as one of its phosphate esters a polyhydroxy alkane alcohol phosphate ester.

As can be understood from the above description, the foliar fertilizer of this invention and the method of making it has several advantages, such as for example: (1) the method of making it provides a high ester yield to minimize toxic effects of unreacted orthophosphates; (2) the time for making the fertilizer is short enough for the process to be ecomonical in view of the large yield; and (3) it can be applied as an effective phosphorus supplement at effective rates without burning the leaves of the plant.

DETAILED DESCRIPTION OF THE PREFERRED EMBODIMENT

In accordance with a preferred embodiment of the invention, a process for making ethylene glycol phosphate esters includes as starting materials phosphoric acid, ethylene glycol, and at least one promoter such as a suitable oxide or hydroxide. The phosphoric acid is preferably orthophosphoric acid ($H_3PO_4$) although limited concentrations of pyrophosphoric acid ($H_4P_2O_7$) or polyphosphoric acids may also be typically present in industrial products in reduced concentrations. Phosphoric acid or more condensed phosphoric acids may also be suitable for use.

In the preferred embodiments, the fertilizer is made with phosphoric acid constituted primarily of orthophosphoric acid. It is advantageous for the phosphoric acid to be processed to remove part or substantially all water from aqueous phosphoric acid solutions used as feedstock. Reduction of water to less than 10% by weight of the phosphoric acid is preferred. Removal of water in the phosphoric acid can occur either during or prior to reaction with the ethylene glycol. Prior removal helps to speed the reaction.

The phosphoric acid and ethylene glycol are combined with an esterification promoter such as an oxide or hydroxide, or mixtures thereof. The reaction mixture is heated to a sufficient temperature and for a sufficient period of time to substantially reduce or maintain low water content, and to esterify a substantial portion, such as a majority or more, of the phosphorus of the mixture into ethylene glycol phosphate esters.

Phosphoric acid is a difficult acid to esterify, because of its electronic structure. According to Cherbuliez and Leber (Recherches sur la formation et les transformations des esters. I sur l'esterification de l'acide phosphorique et ses me'caniames, *Helvetica Chemica Acta*, 35:644–664, 1952), the molecule of orthophosphoric acid is distinct in terms of its stability and does not have a tendency to yield $HPO_3^-$ by dehydration which is susceptable to reaction by addition.

The esterification reactions are believed to be represented by the following reaction equations:

$$2H_3PO_4 = H_2O + H_4P_2O_7 \tag{1}$$

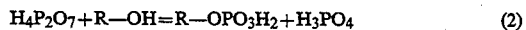

$$H_4P_2O_7 + R\text{—}OH = R\text{—}OPO_3H_2 + H_3PO_4 \tag{2}$$

where R—OH represents the ethylene glycol.

Upon heating the orthophosphoric acid ($H_3PO_4$) is believed to condense to pyrophosphoric acid ($H_4P_2O_7$), liberating water in the process. The pyrophosphoric acid is believed to act as the phosphorylating agent for incorporating phosphorus into the ester. In reaction 1 above, the equilibrium moves significantly to the right as water is eliminated from the system and/or the temperature is increased. The temperature of the reaction mixture, such as at atmospheric pressure, depends upon the boiling point of the mixture and on the stability of ethylene glycol in the acid media. With a simple mixture of ethylene glycol and aqueous phosphoric acid in an open reaction vessel, the boiling temperature increases as the reaction proceeds, the result of removal of water from the system. However, at temperatures above 150° C. carbonization of organic compounds present in the mixture occurs. This carbonization significantly limits conversion of ethylene glycol to ethylene glycol phosphate esters forcing reduction of the temperature and increasing the reaction time. The procedure described in Carre reference apparently sought to overcome this problem by reducing the pressure at which the reaction occurred in order to lower the boiling temperature.

After many trials, the unexpected result was obtained that the boiling temperature and the esterification rate of ethylene glycol and orthophosphoric acid can be increased considerably without carbonization if one or more appropriate esterification promoter(s) are used. Suitable promoters include at least one appropriate oxide or hydroxide which is added to the reaction mixture during esterification. Examples of such hydroxides include potassium hydroxide, sodium hydroxide, calcium hydroxide, magnesium hydroxide, manganese hydroxide, zinc hydroxide, copper hydroxide, cobalt hydroxide, iron hydroxide and others. Examples of such oxides include copper oxides, cobalt oxides, iron oxides, manganese oxides, magnesium oxide, zinc oxide, calcium oxide, and others. The specific mechanism of the promoter(s) is not understood but its dramatic effect in preventing carbonization and allowing esterification to proceed at greater reaction rates has been clearly demonstrated.

It may be possible that oxides increase the reaction rate by reacting to reduce the amount of water present in the reaction system. The action of the oxide or hydroxide promoter may also be to provide either oxygen or hydroxide radicals which combine with hydrogen freed during the condensation and esterification reactions thus facilitating completion of the reaction to the desired ester products. It has also been discovered that the addition of at least some of the hydroxides or oxides indicated above also cause the boiling temperature of the reaction mixture to increase for a given reaction pressure, such as atmospheric. This increased temperature allows the esterification process to proceed at increased rates.

The hydroxides or oxides are preferably included in amounts so that the total oxides and/or hydroxides present during esterification are approximately 10–80% of the molar amount of the phosphorus present in the phosphoric acid. In the case of at least some of the oxides (divalent metals), molar amounts of approximately 10–15% of the molar amounts of phosphorus are even more preferred since this amount is enough to promote the esterification.

The hydroxides are typically included in amounts approximately ranging from 80–90% of the molar amount of phosphorus present. After esterification the pH is adjusted to a pH range from 3–7 with additional quantities of hydroxides. The oxides or hydroxides typically selected for esterification and neutralization will provide elements, particularly metal or ions, which substitute for hydrogens on the ethylene glycol phosphate esters. The resulting substituted esters can be produced with mixed substitutions using a number of different ions in a single batch of fertilizer; or alternatively, the fertilizer compositions can be produced using a single substituting element, metal or ion. A number of different substituted forms of the ethylene glycol phosphate esters can be independently produced each with a different substituting metal, ion or other element of value. These different esters can then be blended to provide a fertilizer blend containing the desired mix of secondary and/or trace elements need for the particular plant(s) being fertilized or soil types in which they are being grown. Other types of substitutions in the ethylene glycol phosphate esters may also be possible with desired elements or radicals intended for other uses of the esters.

In the production of foliarly applicable plant fertilizers it has been found desirable to use hydroxide or oxides which provide substitution of sodium (Na), potassium (K), calcium (Ca), magnesium (Mg), manganese (Mn), copper (Cu), iron (Fe), zinc (Zn), cobalt (Co), and others. More particularly, it has been found desirable to use the following oxides: CaO, MgO, MnO, CuO, $Fe_2O_3$, ZnO, and CoO. Sodium hydroxide (NaOH) and potassium hydroxide (KOH) are appropriately used in promoting the esterification reactions under the present invention. Other esterification promoters may also be effective in such reactions.

The amounts of the divalent cation moiety oxides such as Fe, Cu, Co, Zn, Mg and Mn are limited because these oxides tend to have substantially lower solubilities in the reaction and resulting mixture, as compared to the monovalent cation moiety of the hydroxides, such as K and Na. In general, the nutritional requirements of plants for the divalent ions is much lower and the solubility decrease does not prevent effective amounts from being included as substituted ions in the phosphate ester mixtures of this invention.

The use of zinc oxide in particular has been found to be especially efficient in promoting esterification of phosphoric acid and ethylene glycol and can be included in relatively small quantities while preventing carbonization of the reaction mixture, promoting esterification, and increasing the boiling point. Zinc oxide, zinc metal, platinum metal and possibly other elements or compounds may be effective at providing a catalytic effect which substantially speeds the esterification reaction of phosphoric acid with ethylene glycol.

The preferred molar ratio of ethylene glycol to phosphoric acid in the reaction mixture is preferably greater than 1:1 (ethylene glycol:phosphoric acid). A more preferred range of the ethylene glycol to phosphoric acid molar ratio is 1.1:1 to 2:1. Ratios between 1.1:1 and 2:1 provide excess ethylene glycol which help to facilitate production of the ethylene glycol phosphate esters with reduced reaction times. Molar ratios greater than 2:1 are also possible but no further effectiveness is believed to result from increasing the ratio of ethylene glycol either with respect to speeding the reaction or for use as a component in foliarly applied fertilizers. The excess ethylene glycol remains primarily unreacted. The residual ethylene glycol can be either removed or remain in the final reaction product mixture depending on the desired use of the product. A preferred use of the products described herein is as foliarly applicable fertilizers for plants. The applicants have discovered that the presence of excess ethylene glycol resulting from use of molar ratios of the esterification reactants of greater than 1:1 (ethylene glycol:orthophosphoric acid), especially 1.5:1 to 2:1, create hygroscopic or humectant properties in the end product which are advantageous in providing a product which is suitable for use as a foliarly applicable fertilizer with only pH adjustment generally required.

The promoter or promoter mixture is preferably added to a mixture of the ethylene glycol and phosphoric acid. The promoter is also preferably added prior to substantial heating of the ethylene glycol and phosphoric acid reactant mixture. Addition of one or more of the promoters can occur prior to the addition of ethylene glycol to the phosphoric acid. When Ca, Mg, Zn, Fe or Cu oxides are used, it is possible to add one or more of the promoters after the phosphoric acid has been heated below 175° C. during a preliminary water removal processing.

The phosphoric acid used is preferably orthophosphoric acid such as white industrial grade orthophosphoric acid. Pyrophosphoric acid and/or other forms of more condensed phosphoric acids may also be possible for use in this invention.

The esterification reactant mixture is preferably brought to temperatures in the preferred range of approximately 150°–220° C., or possibly higher, as needed to cause boiling of the mixture in order to eliminate water, and to cause esterification. More preferably, the reaction temperatures will be 160°–220° C. The presence of water in the reaction mixture, either due to its presence in the initial reactants or as generated during the esterification reaction, inhibits the conversion of the glycol and phosphoric acid to the desired phosphate esters. Thus, it is desirable to employ appropriate procedures and equipment to assist in the removal of water from the reaction mixture. Accordingly, the reaction mixture is preferably heated to cause vaporization of water and boiling of the mixture. Stirring means can also be employed to mix the reactants to provide more uniform heating and better assist in vaporization of the water generated in the reaction. Reduction of the vapor pressure in the reaction vessel may also be desirable with the caveat that associated boiling point depression may slow the reaction or reduce conversion to an extent which is derogatory to the desired production of the esters. Similarly, it may be desirable to increase pressures in the reaction vessel in order to increase reaction temperature or for other desired purposes. In general, atmospheric pressure has been found suitable for successful reaction to produce ethylene glycol phosphate esters. Reaction pressures of approximately 0.5-2 atmospheres or higher are believed operable.

The reaction time needed to convert the described reactants to ethylene glycol phosphate esters is approximately 4-6 hours depending upon the amounts in the reaction mixture, the specific procedures followed, the type of reactants used, the composition of the reactant mixture, and the temperatures and pressures at which the reaction is maintained.

The degree of esterification achieved from the reaction preferably provides for conversion of a majority or more, such as approximately 60% of the phosphoric acid into glycol phosphate esters. More preferably, the conversion rate is at least 80% or more. Some esterification reactions have produced 90% conversions with some loss of esterification, up to approximately 10%, upon dilution with water.

The reacted esterified mixture will typically contain some proportion of diesters and triesters in addition to monoesters. It may be desirable for use in at least some foliar fertilizers to convert such diesters and triesters to monoesters because of the possibly greater ease of assimilation of the monoesters by plants when foliarly applied. When the pH of the reacted or resultant mixture is acidic; monoesters, diesters and triesters are expected to be present. Diesters and triesters can be converted to monoesters by adding water and a suitable pH adjusting agent, such as a hydroxide, for example KOH or NaOH, to adjust the mixture to a pH of approximately 7. The solution is then boiled to convert the diesters and triesters to monoesters because of the instability of the diesters and triesters under these conditions. Approximately ten minutes of boiling is typically sufficient to bring about the conversion to monoesters.

Where the finished product is to be used with or as foliar fertilizers, the pH is adjusted to provide a value from approximately 3 to 7. This range of pH has been found best for foliar feeding of plants. The pH is preferably adjusted using potassium hydroxide, anhydrous ammonia ($NH_3$), aqueous solutions thereof, or other pH adjusting compositions which preferably provide additional desired potassium, nitrogen or other plant nutrients in the final fertilizer solutions. Adjustment of pH, if any, as needed for other desired end uses may be subject to particular limitations or requirements. The solubility of some of the ions, such as Ca, Zn, Mg and others, will become saturated when the pH is adjusted to higher values. The solubility limits for any particular ion depends on the pH and the quantities and relative balances of the ions present in the mixture.

The use of the reaction product as a foliar fertilizer also typically involves dilution with water. The amount of dilution will vary dependent upon the desired method of application, type of crop and other factors. The applicants have discovered that relatively concentrated solutions of 0.5-4 molar of the ethylene glycol phosphate ester can be foliarly applied. These can be foliarly applied because of a controlled release of nutrients from a hygroscopic combination of the ethylene glycol phosphate esters and residual ethylene glycol. In such situations the final fertilizer solutions typically are constituted approximately 35-45% or more by weight with the final esterification reaction product. The remaining 55-65% is water, unreacted glycol and additives included in the final fertilizer solutions to be applied.

Crops are fertilized by spraying a liquid solution onto the leaves of the plants, which liquid solution contains at least one phosphate together with other ingredients such that the solution: (1) is sufficiently concentrated to be of substantial nutritive value to the plants when applied at volumes of ten gallons or less per acre, such as having a phosphate ester concentration above 0.5 molar; (2) is in liquid form with sufficient fluidity for spraying; (3) remains in liquid form for a sufficient time to be absorbed by the leaves without crystalizing and to provide a sufficiently low osmotic pressure to avoid necrosis of the leaves when absorbed; (4) is able to translocate throughout the plant from the leaves with efficiency; (5) is able to penetrate into the leaves easily (6) does not cause neutritional imbalances in the plant; and (7) is economical to use.

In its preferred form, the liquid solution: (1) is either hygroscopic or includes sufficient hygroscopic material or both to draw moisture from the air and maintain itself in liquid form; and (2) has improved capabilities for sticking to and remaining on the leaves of plants being fertilized, which can advantageously be provided by a water miscible or water emulsifiable adhering agent which helps to retain the phosphate ester compound and hygroscopic agent on the leaf during application and rainfall.

One catagory of such phosphorus containing fertilizers includes at least one phosphate ester compound. The phosphate ester compounds are formed by reacting a phosphoric acid and ethylene glycol with an esterification promoter such as an oxide or hydroxide in a sufficient amount for a sufficient time and under pressure and temperature conditions that enhance water removal without excessive carbonization, resulting in a relatively high yield. The ethylene glycol phosphate esters may then be neutralized and boiled to convert the diesters and triesters to monoesters. The material provides an excess of ethylene glycol to increase its hygroscopic properties and is diluted to fluidity suitable for foliar application.

The phosphate ester compounds are typically produced using alcohols consisting of or incorporating an alkane diol or triol having a carbon chain length of preferably 2 to 4, more preferably 2 to 3 and most preferably 2. The phosphate esters are present in the liquid fertilizers in amounts one-half molar. The phosphate ester compounds are preferably present in the aqueous fertilizer solution in concentrations from 0.5 to 4 molar. More preferably the concentrations range from 1 to 3 molar of the applied phosphate ester compound.

The preferred fertilizer mixtures or solutions remain in a sustained liquid state sufficiently long to be absorbed by the leaf, such as from one to seven days. The sustained liquid state is preferably accomplished by a water-miscible hygroscopic agent. This may be accomplished through the hygroscopic activity of the ester and/or other hygroscopic agent which allows moisture to be taken from the atmosphere to maintain the fertilizer in an active liquid form on the foliage. The hygroscopic agent is preferably liquid and can be provided as an excess amount of a suitable non-phytotoxic alcohol such as the alkane diol or triol alcohol used in compounding the alcohol phosphate ester forming the active source of phosphorus in the fertilizer solution.

Preferably, the liquid hygroscopic agent or agents is: (1) present in amounts sufficient to maintain the applied fertilizer sprays in liquid form on the plant leaf for a sustained period after application, such as 1-7 days; (2) is included in amounts sufficient to provide collective concentration thereof of approximately one molar or greater; and (3) is provided in collective concentrations of approximately 1 to 10 molar. The hygroscopic agent is advantageouly the phosphate ester and/or alcohol forming one of the moities of the phosphate ester.

DETAILED DESCRIPTION

The foliarly applicable phosphorus fertilizer compositions according to this invention include an aqueous solution or mixture containing at least one phosphate ester compound or mixtures of phosphate ester compounds. The phosphate ester compounds include a phosphate moiety, preferably the orthophosphate moiety ($PO_4^{-3}$) with hydrogen or substituted cations, and an alcohol moiety.

The preferred alcohols: (1) have relatively short carbon chain lengths to provide effective absorption and translocation within the plants being treated; (2) have alkane carbon chains of 2-4 carbon atoms, more preferably 2-3 carbon atoms, and still more preferably 2 carbon atoms; (3) are polyols (containing multiple hydroxy groups (polyhydroxy)), and are preferably diols or triols, with diols most preferred; (3) are water miscible and non-phytotoxic both in the esterified form and as any free alcohols which are present in the fertilizer solutions either by design or due to limited hydrolysis of the esters in the aqueous fertilizer solutions; and (4) have hygroscopic properties as a free alcohol and in the phosphate ester forms.

To best provide this combination of characteristics, the preferred alcohols for use in the phosphate ester fertilizers of this invention include ethylene glycol ($C_2H_4(OH)_2$), propylene glycol ($C_3H_6(OH)_2$) and glycerol ($C_3H_5(OH)_3$). Other hygroscopic, non-phytotoxic and water miscible alcohols may also be appropriate for use in the novel fertilizers.

The preferred alcohols are used in the fertilizer solutions in at least the form of water soluble or water miscible phosphate alcohol esters. Preferred phosphate alcohol esters include ethylene glycol phosphate esters, propylene glycol phosphate esters, and glycerol phosphate esters. Other forms of phosphate esters may also be acceptable such as diethylene glycol phosphate esters, triethylene glycol phosphate esters and others.

The phosphate alcohol esters included in amounts to provide ½ molar or more and are more preferably present in the aqueous fertilizer solutions in amounts sufficient to provide molar concentration of approximately ½-4 moles of phosphate alcohol ester per liter of fertilizer solution. This corresponds to a range of approximately 5-45% by weight (w/w) of the fertilizer solution. More preferably, the phosphate alcohol esters are present in molar concentrations of approximately 0.5-4 moles, still more preferably 1-3 moles per liter of fertilizer solution. The latter corresponds to a range of approximately 10-30% (w/w) of the fertilizer solution.

The use of relatively high concentrations of the active source of phosphorus in an aqueous phosphorus fertilizer solutions is novel and is radically different from the very dilute, less than 0.1 molar, solutions used in prior art foliar phosphorus fertilizers. Although the exact mechanisms which make these novel concentrated phosphate ester fertilizers possible is not known with certainty, it is believed that the hygroscopic nature of the ester and its chemical nature are of importance.

The preferred hygroscopic agents include at least some free non-phytotoxic, water soluble or water miscible alcohol. The alcohols described hereinabove for use as moieties in the phosphate esters are also preferred hygroscopic agents in this invention. The free (non-esterified) alcohols provide additional hygroscopic properties beyond the phosphate esters which are significant in maintaining the applied fertilizer solutions in liquid forms on the plant leaves to thereby enhance absorption of the nutrients into the plants. In most situations the free alcohols present in the fertilizer solutions are of the same type as used in the phosphate alcohol esters forming the primary active source of phosphorus. Alternatively, it may be possible to use other appropriate non-phytotoxic, water soluble or water miscible, hygroscopic alcohols, such as described above, mixtures thereof, or functional substitutes thereof, for performing as the hygroscopic agent(s). Other such suitable hygroscopic agents such as sugars, e.g. sorbitol, may also be useful in this invention.

The non-esterified hygroscopic alcohols or other hygroscopic agent(s) can be included in the fertilizer compositions preferably in molar concentrations of approximately 0-5 moles per liter of fertilizer solution. This corresponds to weight percentages of approximately 0-30% (w/w) of the fertilizer solutions. More preferably the desired hygroscopic, non-phytotoxic, water miscible alcohols are included in amounts sufficient to produce molar concentrations of approximately 1-4 moles per liter of solution. This corresponds to weight percentages of approximately 6-24% (w/w) of the fertilizer solutions. The collective concentration of all hygroscopic agents is approximately 1 molar or greater, preferrably 1-10 molar.

The phosphate esters used as the primary source of phosphorus in the fertilizer solutions can also be provided in a variety of substituted phosphate ester forms. Preferred variations include elements having nutritional value and being substituted for hydrogens of the $H_2PO_4^{-1}$ radical to form salts of the esters. The substitutions are preferably accomplished using metals and/or other ions which provide elements which are of nutritional value to the plants for which a particular fertilizer solution is being formulated. Preferred nutritional elements for use in this invention include copper, iron, magnesium, manganese, cobalt, calcium, and zinc. Ions such as the ammonium ion ($NH_4^+$) and others are also useful. Other non-metal elements of nutritional or other value are also potentially of use in the substituted forms of the phosphate alcohol esters.

The foliage adhering agent can be constituted from a number of suitable mixtures or compounds that provide the fertilizer solutions with improved capabilities for sticking to and remaining on the leaves of plants being fertilized. A suitable foliage adhering agent is crude soy lecithin. Preferred concentrations of crude soy lecithin are approximately in the range 2-10 grams per liter of fertilizer solution, or higher.

The fertilizers can also advantageously be provided with a surfactant or other surface tension lowering agent to better spread the droplets of fertilizer over the leaf surface and improve absorption. One suitable surfactant for use as a water miscible or water emulsifiable foliar spreading agent is sold under the trademark ARMIX 185 available from DeSoto Chemical Corporation of P.O. Box 23523, Harahan, La. 70813. The ARMIX 185 is preferably added in the amounts of approximately 1-4 ml per liter preferably 1.6 ml per liter of fertilizer. Another suitable surfactant is L-77 (trademark SILWET) from Union Carbide Corp., Silicones and Urethane Intermediates Div., Danbury, Conn. 06817. The L-77 is preferably added in amounts sufficient to provide approximately 0.04–2 ml per liter of fertilizer. Other non-ionic, non-phytotoxic, water miscible or water emulsifiable surfactants are also expected to be suitable as spreading agents.

The fertilizer solutions may also include a suitable water miscible or water emulsifiable, non-phytotoxic phloem mobility agent or mixture of suitable agents. Such agents serve to enhance the translocation of phosphorus compounds within the plant to increase the efficiency of the fertilizer solutions. Suitable phloem mobility agents are benzyl adenine and benzyl amino purine. Preferred concentrations of these agents are 100–400 milligrams per liter, more preferably 200 mg/liter of fertilizer solution.

With the use of these agents, difficulties in achieving absorption and mobility within the plant of phosphorus bearing compounds through the waxy cuticle of the leaf are overcome. They keep the material in the liquid state and increase the mobility of the absorbed phosphorus compounds within the plant. Translocation of phosphorus from the leaf to other parts of the plant primarily occurs via narrow phloem vessels. In contrast to some simple polyphosphates and orthophosphate formulations which tend to remain on or within the plant leaves without effectively being translocated to other areas of the plant, the phosphate esters readily move to other portions of the plant.

The fertilizer solutions containing phosphate esters as described above are preferably acidic to neutral pH. Testing with a variety of crops indicates that applied phosphorus fertilizer solutions according to this invention may be effective when provided with pH of approximately 3–7, and pH of approximately 3–5 most preferred in at least some crops due to greater effectiveness of the fertilizers without significant damage to the crop. Fertilizer solutions with approximate pH 3 to pH 3.5 are desired for many plants, such as wheat, potato, tomato, peas, maize and sorghum.

The pH of the fertilizer solutions can be adjusted using a variety of neutralization or pH adjusting techniques. The preferred techniques for pH adjustment employ the addition of acid neutralizing compounds as such, or in aqueous solutions, which also preferably provide elements of nutritional value to plants. Examples of suitable neutralizing agents which can be used in the fertilizer solutions include potassium hydroxide (KOH); sodium hydroxide (NaOH); calcium hydroxide ($Ca(OH)_2$); and ammonium hydroxide ($NH_4OH$). These or other neutralizing agents are added in amounts sufficient to bring the particular fertilizer solution being pH adjusted within the desired pH range.

Fertilizer formulations in accordance with the inventions are expected, under suitable conditions of phosphorus deficiency, to provide yield response and/or growth enhancement for at least the following crops: wheat, clovers, alfalfa, peas, potatoes, tomatoes, maize, sorghum, barley and oats. These fertilizer compositions are also expected to be useful with other plants and crops.

The fertilizers can be applied to totally cover the plant leaf, as in diluted solutions for fruit trees, or sprayed in discrete droplets which cover only a small portion of the leaf. Droplet application is preferred for several reasons, such as for example: (1) it decreases the number of points where the foliage is penetrated by the fertilizer to reduce possible injury effects to the plant leaves; (2) it enables significantly higher concentrations to be used than where total leaf coverage application is employed; (3) it enhances the effect of the hygroscopic agent in maintaining the fertilizer in liquid form on the leaf for a greater period of time; and (4) it more easily permits applications of less than 10 gallons of applied spray per acre and solutions of 20% (w/v) of equivalent $P_2O_5$ content, or higher.

EXAMPLE 1

Ethylene Glycol Phosphate Esters Synthesis & Fertilizer Mixture Including Mg, Zn, Ca, K, and N Forms A 5 liter digestion flask was adapted for being fitted with an appropriate condenser for condensing water vapor removed during esterification within the digestion flask. White 12.1 molar (M) orthophosphoric acid was placed into the digestion flask in an amount of 1927 milliliters (ml) thus providing 23.317 moles of P. The orthophosphoric acid had a specific gravity of 1,575 and phosphorus content equivalent in $P_2O_5$ content of 54.5% (w/v) (weight/volume percent). Note: 200 grams $P_2O_5$ in 1 liter solution equals 20% (w/v). A few chips of carbon were added to the phosphoric acid to help regulate boiling during subsequent heating. Alternatively, a reactor vessel provided with a suitable stirring device could have been employed.

The reaction flask was placed in a heating mantel and heated below 175° C. in order to distill approximately 470–480 ml of water from the phosphoric acid solution. Thereafter 58.76 grams (g or gm) of MgO (1.46 moles) was dissolved in the phosphoric acid. Industrial grade ethylene glycol was then added in the amount of 2600 ml to the resulting solution thus providing 46.634 moles of ethylene glycol having a specific gravity of 1.091. While the resulting mixture was heated, 11.87 g of ZnO (0.146 moles) was dissolved therein. Then 81.73 g of CaO (1.46 moles) was further dissolved in the heating mixture. The resulting mixture of reactants started boiling at approximately 160° C. The temperature was raised gradually in about 1.5 hours to 168° C. A vertical condenser was then connected and the mixture boiled for approximately 2 additional hours to carry out the esterification reaction. The condenser was removed to assist in removal of large vapor release and the temperature of the liquid reaction mixture was approximately 155°–157° C. The temperature of the reaction mixture was raised to 165°–170° C. over a period of 1 hour and 15 minutes. Power to the heating mantel was then turned off and the mixture was allowed to cool to approximately 80° C. The carbon chips were filtered out. The remaining reaction product constituted approximately 3 liters of liquid which was adjusted to 3.5 liters by adding water. The resulting solution was a viscous acidic liquid with specific gravity of 1.41 and pH of less than 1 containing approximately 6.66 moles of elemental phosphorus per liter.

The water adjusted reaction product was then neutralized to achieve a higher pH of approximately 3.1 using 532.5 g KOH (9.492 moles) dissolved to 950 ml with water. Also used in the neutralization was 676 ml of 15.46 molar aqua ammonia (10.45 moles of $NH_3$) of 26° Be, specific gravity of 0.891 (262.85 g/l $NH_3$). The volume was adjusted to 7.571 liters (2 gallons) with water. The resulting fertilizer solution thus contained approximately 3.1 moles of P per liter which is equivalent to 1.54 moles of $P_2O_5$ or 21.85% (w/v) $P_2O_5$ equivalent. The resulting fertilizer solution also contained 0.468% (w/v) Mg; 0.772% (w/v) Ca; 0.126% (w/v) Zn; 4.896% (w/v) K and 1.93% (w/v) N. The specific gravity is approximately 1.22.

The resulting fertilizer solution also provides estimated analysis constituting approximately 30–45% (w/w) (weight/weight) ethylene glycol phosphate esters; 25–20% (w/w) unconverted residual ethylene glycol; 4–5% (w/w) orthophosphates other than phosphate esters; and the remainder, approximately 30–40% (w/w), water.

EXAMPLE 2

Ethylene Glycol Phosphate Esters Synthesis & Fertilizer Mixture Including Mg, Zn, Ca and N Forms The procedure was the same as in Example 1 up to the water adjusted 3.5 liters of 6.666 molar P solution was obtained. Such solution was then neutralized to pH 4.2 by the addition of 1489 ml of 26° Be aqua ammonia (23.022 moles $NH_3$), and the volume was then adjusted to 7.571 liters with water. The composition of the resulting fertilizer solution included 21.85% (w/v) $P_2O_5$; 0.468% (w/v) Mg; 0.772% (w/v) Ca; 0.126% (w/v) Zn; and 4.26% (w/v) N. The specific gravity of the fertilizer solution was approximately 1.20.

EXAMPLE 3

Ethylene Glycol Phosphate Esters Synthesis & Fertilizer Mixtures Sodium Form and Conversion to Monoesters Place in a 5 liter boiling flask with an appropriate condenser 1115 ml of ethylene glycol (20 moles) and mix with 826 ml of 12.1 molar orthophosphoric acid (10 moles) having phosphorus content equivalent to 54.5% (w/v) of $P_2O_5$. Add slowly an aqueous solution containing 325 g NaOH (8.125 moles) in 1100 ml volume. Add a few carbon chips. Distill out 1740–1750 ml of water over about 3 hours 15 minutes. The temperature in the liquid should be about 200° C. Disconnect the condenser and bring the temperature to approximately 210° C. Continue heating for an additional 7 minutes. The temperature will then be approximately 220° C. At this point the degree of esterification should be approximately 90%. Cool to about 80° C. Add slowly 700 ml of water and bring to a boil. Boil for 10 minutes. Add slowly 700 ml of water containing 55 gm (for pH 3.1) or alternatively 280 gm (for pH 7) of NaOH. Boil for 10 minutes. Filter while hot and complete volume to 2.5 liters. The resulting solution will have a concentration of phosphorous that is 4M or with a phosphorus content equivalent to 28.4% (w/v) $P_2O_5$, pH of approximately 3.1 or 7 depending on whether the amount of NaOH added was 55 gm or 280 gm, respectively. The solution will contain mainly monoesters in the sodium form when the final pH is 7 and a mixture of monoesters, diesters and triesters when the final pH is 3.1. The solution with pH7 will have a specific gravity of 1.42 g/ml and will remain liquid even at −10° C. The conversion to monoesters can be done using kOH instead of NaOH in a similar procedure.

EXAMPLE 4

Ethylene Glycol Phosphate Esters Synthesis & Fertilizer Mixtures Potassium Form

Place in a 5 liter flask 1200 ml of 12.1 molar white orthophosphoric acid (14.52 moles of P), 1652 ml of ethylene glycol (29.04 moles) and 662 g KOH (11.8 moles) dissolved to 1180 ml with water. Distill out 2 liters of water by boiling below 190° C. (about 3 hours from the initial boiling start). Cool to 80° C. add 500 ml of water and boil for 10 minutes. Cool. Neutralize to pH 7.2 with 10.98 ml of a solution containing 616 g of KOH (10.98 moles). Boil for 10 minutes and adjust the volume to 3.630 liters. This solution is 28.38% (w/v) $P_2O_5$ (4M P) and 24.54% (w/v) K. The specific gravity is 1.42.

Foliar fertilizers in accordance with the invention provide the following functional advantages:

a) capability of readily penetrating plant leaves, yet maintaining liquidity and fertilization activity on the plant leaf surface over a period of at least one day, preferably several days or longer;

b) rapid mobilization of phosphorus within the plant which is readily transported away from the point of entry of fertilizer from droplets into the plant; and c) sufficient solubility to permit dissolution and application of fertilizer solutions which can contain up to or greater than 18 pounds of $P_2O_5$ equivalent phosphorus in ten gallons of solution.

It has been found preferable to provide liquid phosphorus containing fertilizers which have effective phosphorus content of at least 20% weight/volume of equivalent $P_2O_5$ in the solution applied to the plant. This level of phosphorus content provides for adequate nutritive value where low spray rates are to be applied.

The foliar fertilizers in accordance with the invention can be applied to totally cover the plant leaf, as in diluted solutions for fruit trees, or sprayed in discrete droplets which cover only a portion of the leaf. Droplet application is preferred to decrease the number of points where the foliage is penetrated by the fertilizer to reduce possible injury effects to the plants. This also enables significantly higher concentrations to be used than where total coverage application is employed. Droplet application is also believed to enhance the effect of the hygroscopic agent in maintaining the fertilizer in liquid form on the leaf for a greater period of time. Droplet application is preferred for applications of less than 10 gallons of applied spray per acre and solutions of 20% (w/v) of equivalent $P_2O_5$ content, or higher.

The fertilizer solutions are preferably applied in aqueous solutions having concentrations of ½–4 molar, more preferably 1–3 molar. Application rates of approximately 2.5–20 gallons of fertilizer solution per acre appear useful depending on the particular type of crop being fertilized and the concentration of the active ingredients in the particular solution.

Fertilizer formulations in accordance with the inventions provide growth enhancement for at least the following crops: wheat, clovers, alfalfa, peas, potatoes, tomatoes, maize, sorghum, barley and oats. The inventive fertilizer compositions are also expected to be useful with other plants and crops.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

What is claimed is:

1. A process for producing a fertilizer composition useful for foliar application to an appropriate plant, comprising the steps of:

mixing at least one glycol, at least one phosphoric acid and at least one esterification promoter material together to form a reaction mixture in amounts sufficient to provide a ratio of ethylene glycol to phosphorous which approximates the range of 1½:1 to 2:1;

heating the reaction mixture from the previous step to temperatures in excess of 150° C. wherein esterification occurs to produce an esterified reaction product containing phosphate esters with the esterification promoter being added to the reaction mixture at least before the completion of the esterification; and adjusting the reaction product to a pH level and adjusting the concentration of the phosphate esters to a concentraction suitable for application to foliage of plants being fertilized.

2. A process in accordance with claim 1 in which the step of mixing at least one glycol, at least one phosphoric acid and at least one esterification promoter material together to form a reaction mixture comprises the step of mixing at least one water miscible polyhydroxy alcohol, at least one phosphoric acid and at least one esterification promoter material together to form a reaction mixture.

3. A process in accordance with claim 1 in which the step of mixing at least one glycol, at least one phosphoric acid and at least one esterification promoter material together to form a reaction mixture comprises the step of mixing at least one water alcohol, at least one phosphoric acid and at least one esterification promoter material together to form a reaction mixture wherein said esterification reaction promoter is an oxide or hydroxide.

4. A process in accordance with claim 1 in which the step of adjusting the reaction product to a pH level and adjusting the concentration of the phosphate esters to a concentraction suitable for application to foliage of plants being fertilized comprises the step of diluting the reaction mixture with water sufficient to provide a molar concentration of said phosphate esters of at least one half molar.

5. The process of claim 1 wherein a at least one liquid hygroscopic agent in sufficient quantity to help maintain applied droplets of foliar fertilizer in liquid form on the foliage for at least one day is included in the fertilizer composition whereby a nutritional supplementation of phosphorus for application as a liquid aqueous foliar fertilizer solution to the foliage of plants without damage to the leaves is formed.

6. A process for producing a fertilizer composition useful for foliar application to an appropriate plant, comprising the steps of:

combining ethylene glycol, phosphoric acid, and an esterification promoter material together in a mixture;

said ethylene glycol being present in said mixture in molar amounts in excess of the molar amount of elemental phosphorus;

said esterification promoter material including at least one hydroxide or oxide;

heating said mixture to temperatures in excess of 150° C. to cause substantial boiling and removal of water from the mixture;

heating said mixture for sufficient time to esterify at least a majority of the phosphorus with ethylene glycol radicals from the ethylene glycol to produce ethylene glycol phosphate esters in a reaction product also containing excess unreacted ethylene glycol, wherein the esterification promoter material is added to the mixture prior to esterifying at least a majority of the phosphorus;

adjusting the reaction product to provide a fertilizer composition having pH approximately in the range 3–7.

7. A process according to claim 6 wherein said esterification promoter material includes at least one hydroxide or oxide in a form combined with at least one metal or metal ion.

8. A process according to claim 6 wherein said esterification promoter material includes at least one hydroxide or oxide in a form combined with at least one alkali metal or alkaline earth metal which is of nutritional value in said plant.

9. A process according to claim 6 wherein said promoter material includes at least one hydroxide or oxide taken from a group consisting of sodium hydroxide, potassium hydroxide, calcium hydroxide, magnesium hydroxide, manganese hydroxide, zinc hydroxide, copper hydroxide, cobalt hydroxide, copper oxides, cobalt oxides, calcium oxides, zinc oxides, manganese oxides, magnesium oxides, and iron oxides.

10. A process according to claim 6 wherein said phosphoric acid is processed prior to said combining with ethylene glycol to reduce water content of the phosphoric acid.

11. A process according to claim 6 wherein said ethylene glycol is combined with said phosphoric acid in amounts sufficient to provide a ratio of ethylene glycol to phosphorus which approximates the range 1½:1 to 2:1.

12. A process according to claim 6 wherein said heating is substantially performed at approximately atmospheric pressure.

13. A process according to claim 6 wherein said heating is substantially performed under pressures approximately in the range ½ to 2 atmospheres.

14. A process according to claim 1 wherein said heating is accomplished within approximately 1–6 hours.

15. A process according to claim 6 wherein the phosphoric acid is primarily orthophosphoric acid.

16. A process according to claim 6 wherein the phosphoric acid is industrial grade orthophosphoric acid containing impurities which provide elements which are of nutritional value to said appropriate plant.

17. A process according to claim 6 and further defined by adjusting the reaction product to a pH of approximately 7 or higher and heating to convert substantial portions of diesters and triesters to monoesters.

18. A process for producing a fertilizer composition useful for foliar application to an appropriate plant, comprising:

combining ethylene glycol, phosphoric acid and an esterification promoter material to provide a mixture having an excess of ethylene glycol molecules as compared to the number of phosphorus atoms available from the phosphoric acid;

heating said mixture to temperatures in excess of 150° C. and sufficient to cause substantial boiling of water vapor from the mixture;

heating said mixture with the esterification promoter material present in the mixture for sufficient time to convert a majority of phosphorus in the mixture into esterified forms with ethylene glycol radicals from the ethylene glycol, to produce a reaction product, wherein said promoter material acts to raise the boiling temperature of said mixture and substantially prevent carbonization of the mixture at temperatures approximately in the range of 150°–220° C.; and adjusting the reaction product to provide a fertilizer composition having pH approximately in the range of 3–7.

19. A process according to claim 18 wherein the said heating is substantially performed under pressures approximately in the range of ½ to 2 atmospheres.

20. A process according to claim 18 wherein said esterification promoter material includes at least one hydroxide or oxide.

21. A process according to claim 18 wherein said promoter material includes at least one hydroxide or oxide in a form combined with at least one metal.

22. A process according to claim 18 wherein said promoter material includes at least one hydroxide or oxide in a form combined with at least one alkali metal or alkaline earth metal.

23. A process for producing ethylene glycol phosphate esters, comprising:

combining ethylene glycol, at least one phosphoric acid, and an esterification promoter to produce a reaction mixture; said esterification promoter being selected from the group consisting of sodium hydroxide, potassium hydroxide, calcium hydroxide, magnesium hydroxide, manganese hydroxide, zinc hydroxide, copper hydroxide, cobalt hydroxide, copper oxides, cobalt oxides, calcium oxides, zinc oxides, manganese oxides, magnesium oxides, and iron oxides; said ethylene glycol and said at least one phosphoric acid being combined in relative amounts to provide a reaction mixture having more ethylene glycol molecules than phosphorus atoms;

heating said reaction mixture to an esterification temperature in the approximate range of 150°–220° C.;

maintaining the reaction mixture at an esterification temperature in said approximate range of 150°–220° C. for sufficient reaction time to esterify ethylene glycol with said at least one phosphoric acid to form an esterified reaction product;

removing water from the reaction mixture during said maintaining step.

24. A process according to claim 23 wherein said ethylene glycol and said at least one phosphoric acid are combined in relative amounts to provide a reaction mixture having a ratio of ethylene glycol molecules to phosphorus atoms in the approximate range of 1 ½:1 to 2:1.

25. A process according to claim 23 and further comprising adjusting the pH of the esterified reaction product to obtain a resulting pH in the approximate range of 3–7.

26. A process according to claim 23 and further comprising increasing the pH of the esterified reaction product to approximately 7 or greater and heating to convert diester and triesters to monoesters.

27. A process according to claim 23 and further comprising:

increasing the pH of the esterified reaction product to approximately 7 or greater and heating to convert diester and triesters to monoesters;

adjusting the pH of the esterified reaction product to obtain a resulting pH in the approximate range of 3–7.

28. A process for producing a liquid foliar fertilizer, comprising:

combining ethylene glycol, at least one phosphoric acid, and an esterification promoter to produce a reaction mixture; said esterification promoter being selected from the group consisting of oxides and hydroxides of minerals of nutritional significance to plants; said ethylene glycol and said at least one phophoric acid are combined in realtive amounts to provide a reaction mixture having a ratio of ethylene glycol molecules to phosphorus atoms in the approximate range of greater than 1:1 to 2:1;

heating said reaction mixture to an esterification temperature in the approximate range of 150°–220° C.;

maintaining the reaction mixture at an esterification temperature in said approximate range of 150°–220° C. for sufficient reaction time to esterify ethylene glycol with said at least one phosphoric acid to form an esterified reaction product;

removing water from the reaction mixture during said maintaining step;

adjusting the pH of the esterified reaction product to obtain a resulting pH in the approximate range of 3–7.

* * * * *